UNITED STATES PATENT OFFICE.

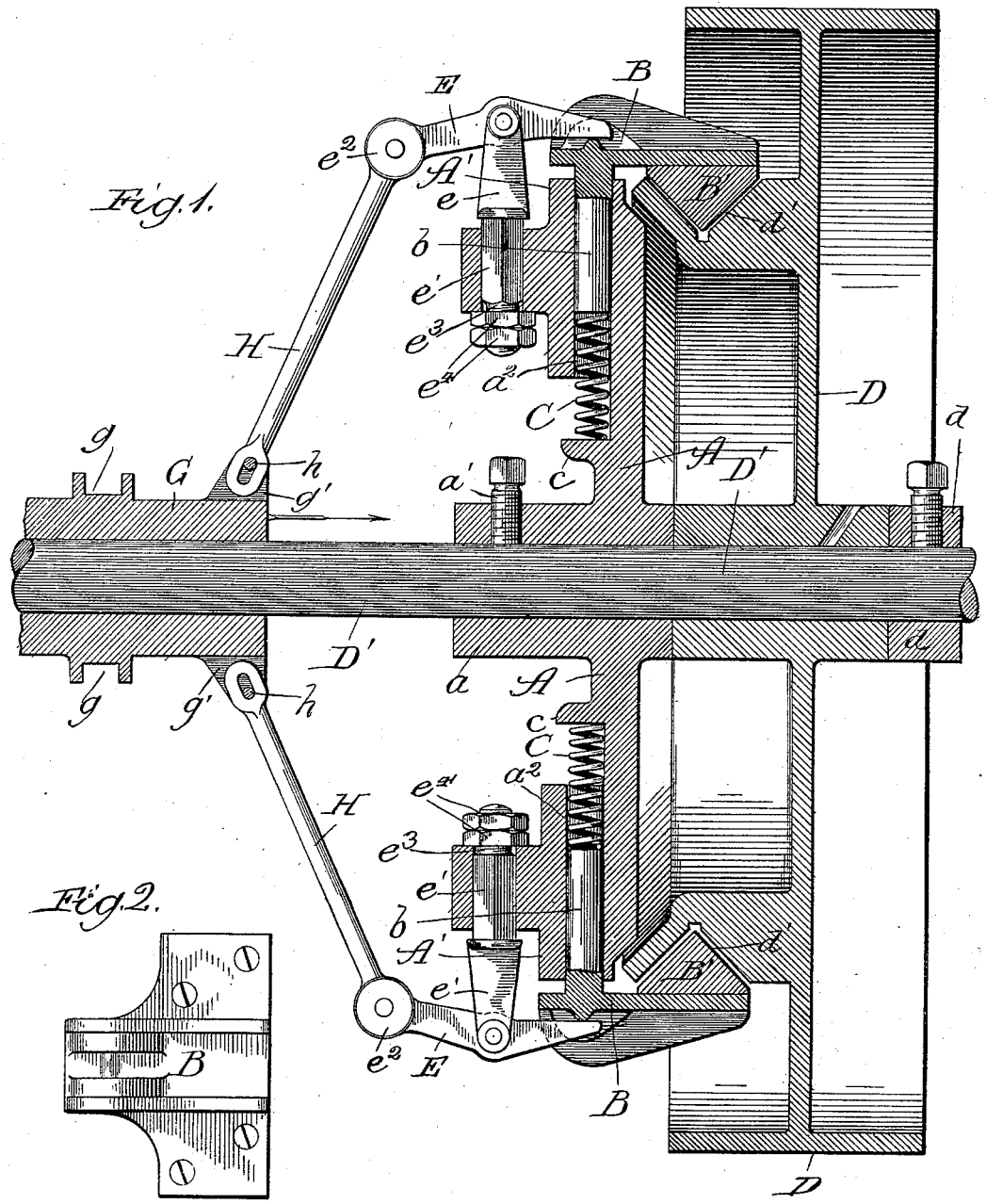

SEWARD N. MIGHELL, OF CHICAGO, ILLINOIS, ASSIGNOR OF ONE-HALF TO NICHOLAS HEINSEN, OF SAME PLACE.

FRICTION-CLUTCH.

SPECIFICATION forming part of Letters Patent No. 553,196, dated January 14, 1896.

Application filed January 5, 1895. Serial No. 533,956. (No model.)

*To all whom it may concern:*

Be it known that I, SEWARD N. MIGHELL, a citizen of the United States, residing at Chicago, Cook county, Illinois, have invented certain new and useful Improvements in Friction-Clutches, of which the following is a specification.

The object of my invention is to provide a simple and economical friction-clutch to be used in connection with pulleys of counter-shafts or for coupling shafts together; and the invention consists in the features and combinations hereinafter described and claimed.

In the drawings, Figure 1 is a sectional elevation showing my improvement in connection with a counter-shaft and loose pulley, and Fig. 2 a plan view of one of the shoes.

In constructing my improvement I provide what I term a "spider" portion A, which is provided with a hub $a$, having an axial opening into which a counter or other shaft may be fitted, and to which it is secured by means of the set-screw $a'$. This spider portion is preferably provided with a number of lugs $A'$, which have radial openings $a^2$ adapted to receive studs on the shoe portion hereinafter described. In order to grasp a loose or other pulley a plurality of shoes B are provided, having projecting studs $b$ adapted to fit loosely in the radial openings of the spider portion. These shoes are each provided with a wear or friction plate $B'$, as shown in the drawings, and I prefer to make them of an angle of substantially ninety degrees, with the apex of the angle directed toward the center of the wheel, so that it may engage a correspondingly-shaped groove on the loose pulley. Spiral springs C of the desired tension are inserted between lugs $c$ on the spider and the studs of the shoes, so as to normally keep the shoes from engaging with the loose pulley.

In order to communicate the motion of the spider to a pulley or other shaft, I provide a pulley D and mount it loosely upon the shaft $D'$, to which the spider is firmly secured. A collar $d$ prevents sidewise or lateral motion of the loose pulley upon the shaft. This loose pulley is provided with an annular V-shaped groove $d'$, of substantially the same angle as the wear or friction plate upon the shoe, so that when the shoes are pressed inwardly, as hereinafter described, a maximum engaging friction may be obtained between the friction-plates and the loose pulley, and the rotations or revolutions of the spider thereby communicated to the loose pulley, or vice versa.

In order to cause a firm, positive engagement of the shoe and the loose pulley, weighted actuating-levers E are provided, one for each shoe, fulcrumed upon adjustable studs $e$, whose angular portion $e'$ is inserted in the extensions of the lugs $A'$ on the spider. These actuating-levers have their inner free ends arranged to contact a small raised portion of the shoe, while their outer ends are provided with balance-weights $e^2$, which in a measure serve to counterbalance the weights of other parts during the rapid rotation of the clutch. To vibrate these actuating-levers a sleeve G is mounted loosely upon the counter-shaft and is provided with an annular groove $g$, which may be engaged by a shifting-rod of any ordinary construction, so as to move it longitudinally upon the counter-shaft. To communicate the motion of this sleeve to the actuating-levers a link H is provided, which has one end pivoted to the actuating-lever adjacent to the weight and its opposite end provided with an elongated slot, through which a pin $h$ is passed, this pin being also passed through lugs $g'$ on the sleeve. As the sleeve is moved in the direction indicated by the arrow, to the right, it approaches more nearly under the actuating-levers, so that their weighted ends are forced upward and out, while their free ends are forced inward toward the axis of rotation, thereby carrying with them the shoes, with their friction-plates, into positive engagement with the loose pulley.

The fulcrum-studs are provided with threaded portions $e^3$ at their inner end, upon which lock-nuts $e^4$ are secured and arranged to abut against the inner ends of the lugs upon the spider. This arrangement is for the purpose of giving the desired location to the fulcrum of the actuating-levers. For instance, if the fulcrum-point is pushed out to its greatest extent the least friction is obtained between the shoe and the loose pulley, while the opposite arrangement, or drawing in of the fulcrum-point, serves to obtain the greatest possible friction with the loose pulley. The adjustment, however, is principally for the purpose of obtaining the desired friction, and not to obtain the greatest or least. The links H, as above described, are provided with elongated slotted portions at their inner ends, so that a certain amount of loose play is permitted to the sleeve, in that it may be often necessary to provide two of these clutches adapted to be operated by the same sleeve, so that one of the clutches can then be released before the other is actuated or vice versa. It will be understood also that two of these clutches can be combined for use in connection with one counter-shaft, each of which should be arranged adjacent to suitable pulleys having different speeds of rotation or reverse motions. In that case, of course, it will be understood that the loose pulley will be the driver, and the friction-clutch a means of transmitting motion and power to the counter-shaft, or by it to some other machine or shaft.

The advantages of my mechanism are that I have provided a simple and economical friction-clutch that may be adapted for use on counter-shafts or as a coupling for two shafts that are in alignment. In the event of its being used as a shaft-coupling the two shafts should have their ends arranged adjacent to each other somewhere in the vicinity of the hub of the spider and pulley. The pulley should be firmly secured to the shaft, so that its rotation is transmitted to the shaft or vice versa. By moving the loose sleeve one way or the other upon its shaft, a positive engagement is secured between the clutch and the pulley, so that the motion of one shaft may be transmitted to the other. This advantage will be readily appreciated by those skilled in the art of machines, and especially counter-shaft construction. Another advantage of my mechanism is that when the weighted ends of the actuating-levers are forced out to obtain the necessary frictional engagement, the weights act in a measure to counterbalance the weight of other parts, assist in the engagement of the parts, and secure an easy running motion with very little vibration or noise.

While I have described my invention with more or less minuteness as regards details, I do not desire to be limited thereto unduly any more than is pointed out in the claims. On the contrary I contemplate all proper changes in form, construction and arrangement, the omission of parts and substitution of equivalents as circumstances may suggest or render expedient.

I claim—

1. In a friction clutch, the combination of a spider portion adapted to be secured to a shaft, a plurality of radially movable shoes mounted in the spider and provided with angular friction plates at their inner surfaces to contact an adjacent rotatable pulley, a rotatable pulley mounted adjacent to the spider and provided with a portion adapted to be contacted and firmly engaged by the friction plates of the shoes, actuating levers weighted at their outer ends and mounted on the spider portion arranged to contact the shoes and move the same inwardly to engage the rotatable pulley, a longitudinally movable sleeve, and links engaging the sleeve and actuating levers to impart the motions of the sleeve to the actuating levers and cause the engagement of the shoes and rotatable pulley or release the same, substantially as described.

2. In friction clutches, the combination of a spider portion adapted to be secured to a shaft, a plurality of radially movable shoes mounted on the spider portion and provided with V-shaped friction plates at their inner surfaces to contact and engage the rotatable pulley, a rotatable pulley mounted adjacent to and provided with a V-shaped groove to be engaged by the friction plates of the shoes, levers weighted at their outer ends and adjustably mounted on the spider to actuate the shoes, a longitudinally movable sleeve, and links connecting the longitudinally movable sleeve and actuating levers to cause the engagement and permit the disengagement of the shoes and rotatable pulley, substantially as described.

3. In friction clutches, the combination of a spider portion adapted to be secured to a shaft, a plurality of radially movable shoes mounted on such spider portion and provided with V-shaped friction plates at their inner surfaces to engage a rotatable pulley, a rotatable pulley mounted adjacent to and provided with a V-shaped groove to be engaged by the friction plates of the shoes, spring mechanism to hold the shoes normally disengaged, actuating levers adjustably mounted on studs to actuate the shoes and cause frictional engagement of the shoes and rotatable pulley, angular studs adjustably mounted in the spider portion to form adjustable fulcrums for the actuating levers, a longitudinally movable sleeve, and links connecting the longitudinally movable sleeve and actuating levers to cause the engagement or permit the disengagement of shoes and pulley, substantially as described.

4. In friction clutches, the combination of a spider portion adapted to be secured to a shaft, a plurality of radially movable shoes mounted in such spider portion and provided with V-shaped friction plates on their inner surfaces to engage a rotatable pulley, a rotatable pulley adjacent to and provided with a V-shaped groove to be engaged by the friction plates, spring mechanism to keep such shoes and rotatable pulley normally disengaged, actuating levers weighted at their outer ends and mounted on such spider to actuate the shoes and cause their engagement with the rotatable pulley, a longitudinally movable sleeve, links having one end pivoted to the actuating levers and their other end slotted to be engaged by the longitudinally movable sleeve and impart motion to the actuating levers during a portion of the movement of such sleeve, substantially as described.

SEWARD N. MIGHELL.

Witnesses:
N. HEINSEN,
THOMAS F. SHERIDAN.